United States Patent [19]

Williamson et al.

[11] Patent Number: 4,743,382

[45] Date of Patent: May 10, 1988

[54] METHOD AND APPARATUS FOR SEPARATING SUSPENDED SOLIDS FROM LIQUIDS

[75] Inventors: Kenneth J. Williamson, Corvallis, Oreg.; Perry L. McCarty, Stanford, Calif.

[73] Assignee: The State of Oregon Acting by and through the State Board of Higher Education on Behalf of Oregon State University, Eugene, Oreg.

[21] Appl. No.: 78,607

[22] Filed: Jul. 28, 1987

Related U.S. Application Data

[63] Continuation of Ser. No. 485,134, Apr. 20, 1983, abandoned, which is a continuation of Ser. No. 333,788, Dec. 23, 1981, abandoned, which is a continuation of Ser. No. 175,778, Aug. 6, 1980, abandoned.

[51] Int. Cl.$^4$ .................. B01D 21/06; B01D 23/10; B01D 23/24

[52] U.S. Cl. .................... 210/786; 210/661; 210/792; 210/797; 210/807; 210/150; 210/265; 210/269; 210/274; 210/528

[58] Field of Search ................ 210/661, 786, 792–798, 210/800–804, 807, 150, 151, 189, 263, 265, 269, 270, 272, 274, 275, 528, 530, 532.1

[56] References Cited

U.S. PATENT DOCUMENTS

| | | | |
|---|---|---|---|
| 468,984 | 2/1892 | Boeing | 210/203 |
| 713,759 | 11/1902 | Goade | 210/276 |
| 1,403,311 | 1/1922 | Gaillet | 210/521 |
| 2,057,887 | 10/1936 | Elliott et al. | 210/141 |
| 2,069,621 | 2/1937 | Patrick | 210/263 |
| 2,353,602 | 7/1944 | Trotter | 210/55 |
| 2,572,848 | 10/1951 | Fitch | 210/24 |
| 2,715,964 | 8/1955 | Martin | 210/189 |
| 2,742,381 | 4/1956 | Weiss et al. | 134/25 |
| 2,758,070 | 8/1956 | Yurko | 196/147 |
| 2,878,935 | 3/1959 | Magrath | 210/265 |
| 2,925,382 | 2/1960 | Kent et al. | 208/304 |
| 3,122,594 | 2/1964 | Keilback | 261/94 |
| 3,232,434 | 2/1966 | Albersmeyer | 210/151 |
| 3,293,174 | 12/1966 | Robjohns | 210/150 |
| 3,305,096 | 2/1967 | Schleiss | 210/195 |
| 3,343,680 | 9/1967 | Rice | 210/263 |
| 3,424,674 | 1/1969 | Webber | 210/275 |
| 3,446,357 | 5/1969 | Gomella | 210/265 |
| 3,557,955 | 1/1971 | Hirs et al. | 210/276 |
| 3,635,764 | 1/1972 | Setser et al. | 204/150 |
| 3,671,426 | 6/1972 | Orcutt et al. | 210/289 |
| 3,698,554 | 10/1972 | Mail | 210/275 |
| 3,701,423 | 10/1972 | Lindstol | 210/794 |
| 3,715,964 | 8/1955 | Martin | 210/265 |
| 3,770,131 | 11/1973 | Davis et al. | 210/519 |
| 3,814,245 | 6/1974 | Hirs | 210/279 |
| 3,814,247 | 6/1974 | Hirs | 210/279 |
| 3,846,305 | 11/1974 | Schreiber | 210/150 |
| 3,948,767 | 4/1976 | Chapman | 252/325 |
| 3,956,128 | 5/1976 | Turner | 210/150 |
| 4,052,300 | 10/1977 | Mosso | 210/786 |
| 4,062,775 | 12/1977 | Pielkenrood | 210/189 |
| 4,100,070 | 7/1978 | White | 210/136 |
| 4,115,266 | 9/1978 | Ohshima | 210/786 |
| 4,125,467 | 11/1978 | Haddad | 210/800 |
| 4,157,959 | 6/1979 | Wen et al. | 210/274 |
| 4,198,301 | 4/1980 | Iwatani | 210/274 |
| 4,290,894 | 9/1981 | Torok et al. | 210/661 |
| 4,420,403 | 12/1983 | Tufts | 210/787 |
| 4,427,555 | 1/1984 | Brown et al. | 210/805 |
| 4,446,027 | 5/1984 | Simmers | 210/661 |

FOREIGN PATENT DOCUMENTS

| | | | |
|---|---|---|---|
| 883327 | 4/1960 | United Kingdom | 210/263 |
| 1147054 | 4/1969 | United Kingdom | 210/275 |
| 1204880 | 9/1970 | United Kingdom | 210/265 |
| 1264782 | 2/1972 | United Kingdom | 210/265 |
| 1305399 | 1/1973 | United Kingdom | 210/265 |
| 1317433 | 5/1973 | United Kingdom | 210/278 |
| 2021428A | 12/1979 | United Kingdom | 210/265 |

OTHER PUBLICATIONS

Sanks, Water Treatment Plant Design, Ann Arbor Science, 149, 150, 176–179, 231, 232, 302–310.
Simmers, Buoyant Media Filter Proceedings of the 40th International Water Conference, Oct. 30, 31, Nov. 1, 1979, pp. 25–27.

*Primary Examiner*—Ernest G. Therkorn
*Attorney, Agent, or Firm*—Klarquist, Sparkman, Campbell, Leigh, & Whinston

[57] ABSTRACT

Liquid which has been partially clarified in the settling zone of a clarifier tank is channelled through a filtration compartment containing a buoyant particulate filtration media. The media particles are periodically agitated so that trapped solids are separated from the media and retained in the clarifier tank.

8 Claims, 4 Drawing Sheets

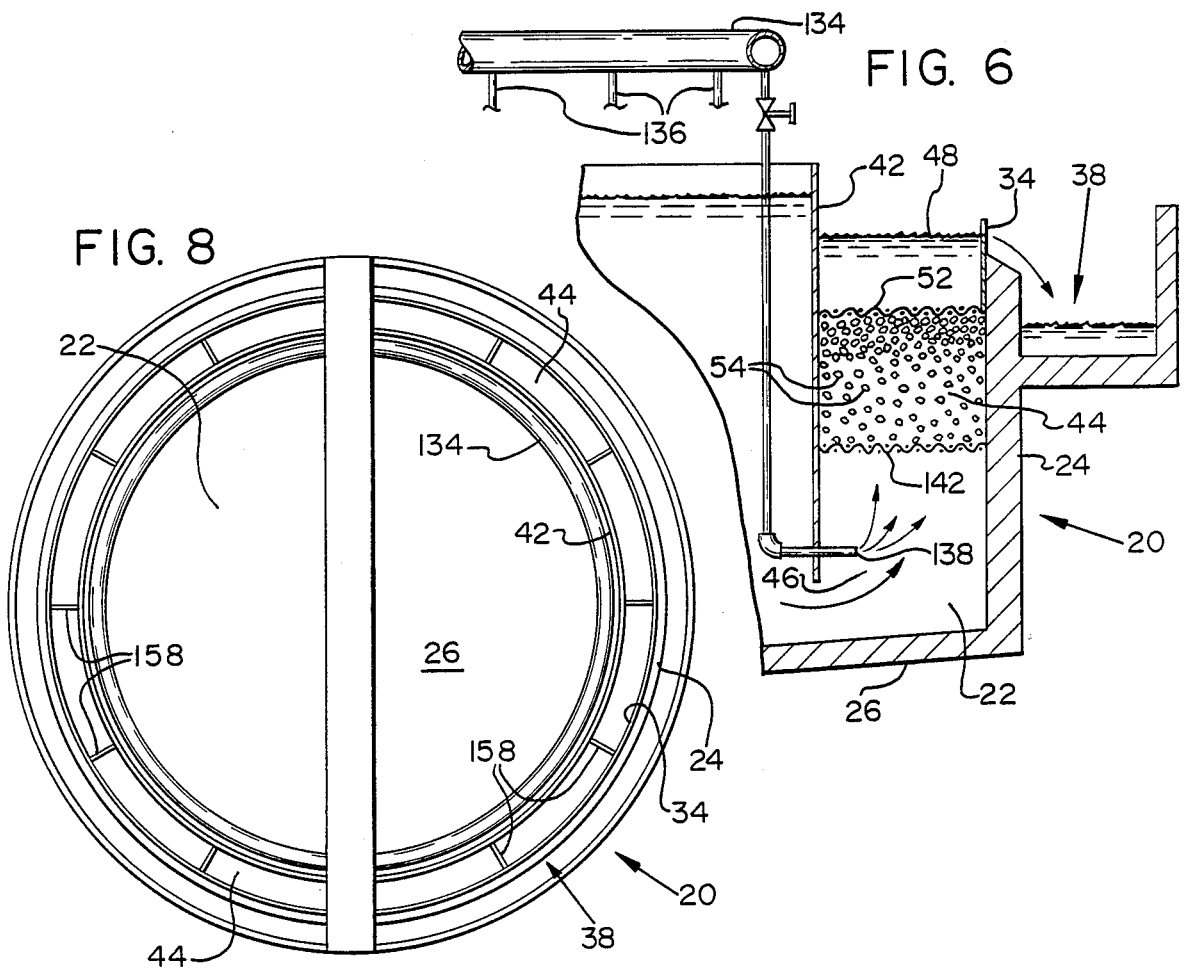
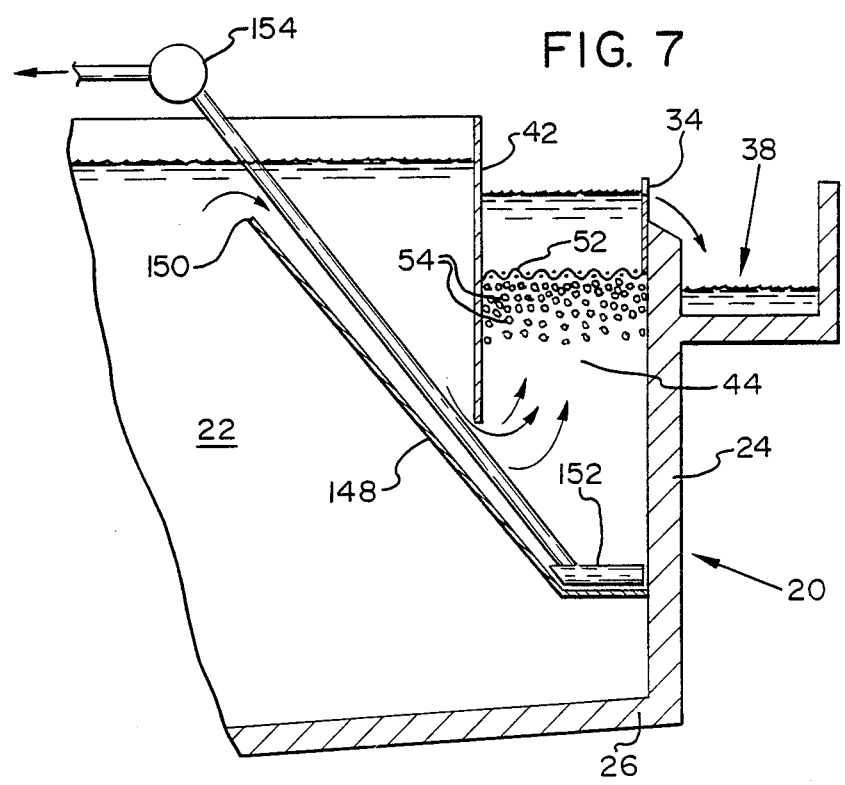

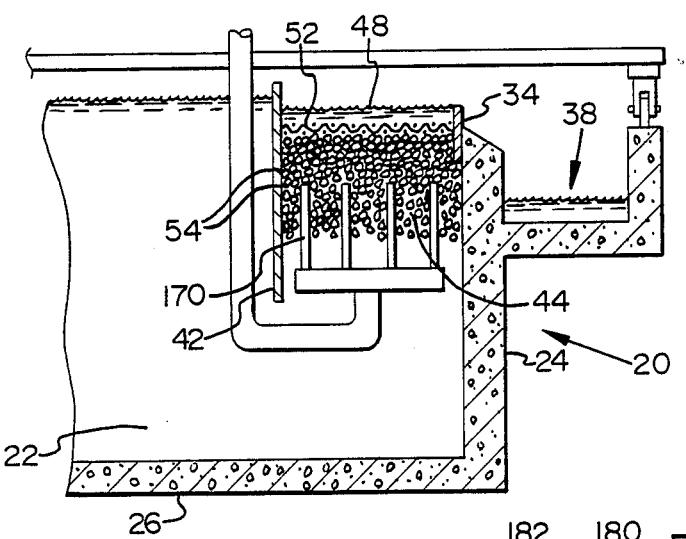
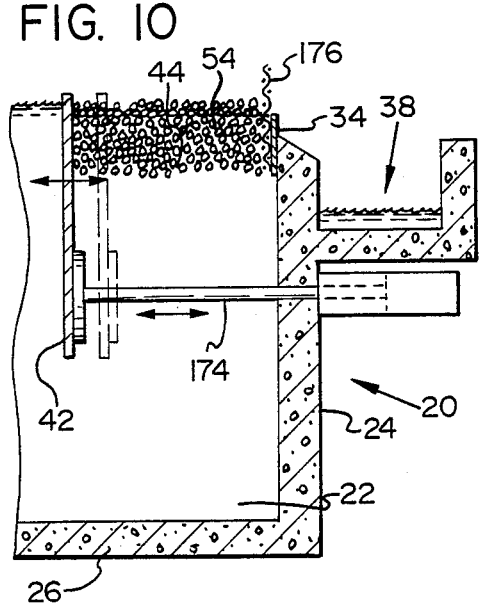
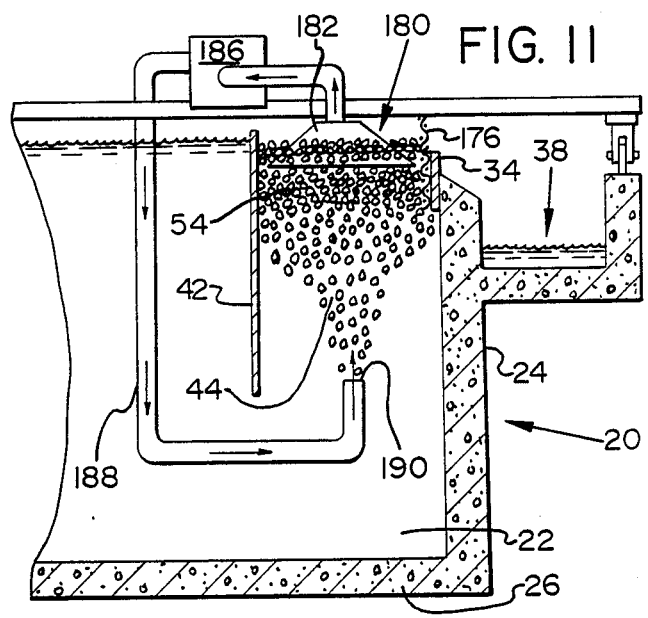
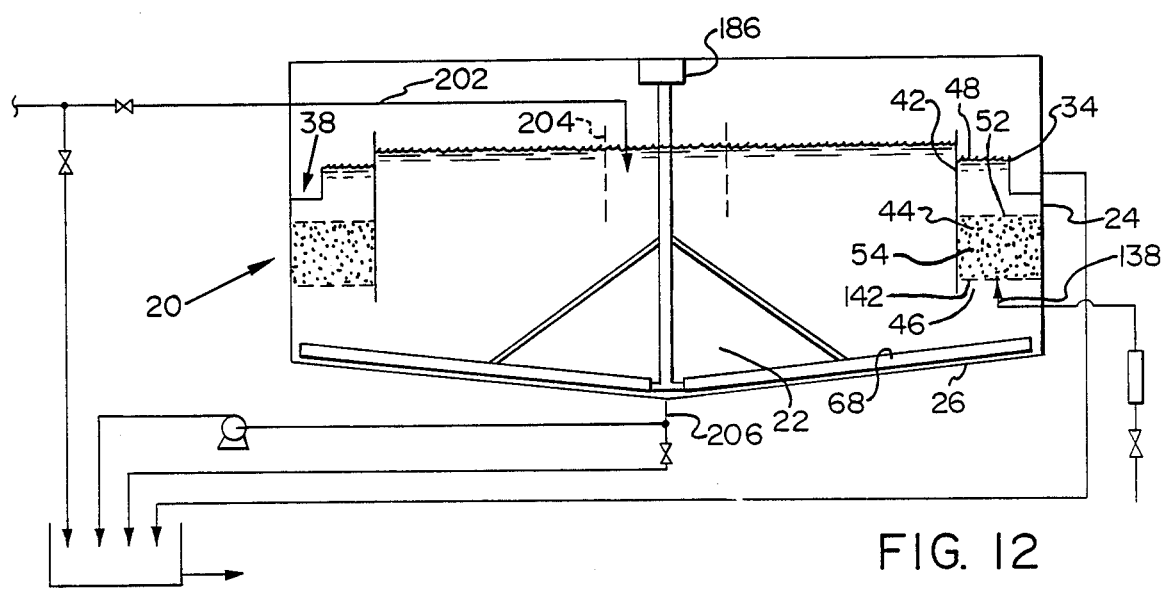

METHOD AND APPARATUS FOR SEPARATING SUSPENDED SOLIDS FROM LIQUIDS

This is a continuation of application Ser. No. 485,134, filed on Apr. 20, 1983, now abandoned; which is a continuation of application Ser. No. 333,788, filed on Dec. 23, 1981, now abandoned; which is a continuation of application Ser. No. 175,778, filed on Aug. 6, 1980, now abandoned.

BACKGROUND OF THE INVENTION

The present invention relates to the separation of solid particles from a liquid suspension. More specifically, it relates to the removal of suspended solids from liquid which has been partially clarified by gravitational separation in a clarifier tank.

The use of clarifier tanks for the gravitational separation of solids from liquids is well known. Such tanks have been used for separating precipitates formed in chemical processes and for a variety of other industrial purposes. One of the most well-known and widely practiced uses of gravitational clarification is the purification of water or liquid waste, such as water from municipal sewage.

Unfortunately, only a portion of the suspended solids contained in water or liquid waste can be effectively removed by gravitational clarification. Water leaving a clarifier will normally contain a significant amount of fine suspended solids. Further treatment to remove suspended solids from such liquid is thus required to obtain liquid of a high purity. Typically, partially clarified liquid is piped to a location remote from the clarifier tank where it is processed in a tube settler, a sand filter or other conventional solids separation device.

Numerous filtration and other devices have been made to separate solids from a suspending liquid. For example, U.S. Pat. No. 3,343,680 to Rice et al. shows a filtration apparatus. Example 4 of that patent describes the use of an upflow filter containing media comprised of materials having a density somewhat less than that of water.

More recent patents, U.S. Pat. No. 3,424,674 to Webber and U.S. Pat. No. 4,115,266 to Ohshima show somewhat related upflow filtration systems containing buoyant media. Each of these prior systems has unique characteristics, but neither is particularly well suited for the purpose of separating suspended solids from partially clarified water or liquid waste which is the effluent of a clarifier tank.

Specifically, the above devices could not be integrally incorporated in a clarification system.

U.S. Pat. No. 4,062,775 to Pielkenrood and U.S. Pat. No. 4,125,467 to Haddad et al. show devices containing multiple contactors which provide large areas of surface on which suspended solids can coalesce. Haddad further shows the use of such material in a Dorr settling pond so that solid separation by gravitational settling and coalescence can take place in a single unit.

Although such devices might be useful for collecting solids and for other purposes, they could not sufficiently separate fine solids from clarified water or liquid waste. Even if a device shown in the Haddad or Pielkenrood patents could be used, a substantial amount of external processing equipment would be required to obtain high purity liquid from water or liquid waste which was partially clarified in a clarifier tank.

SUMMARY OF THE INVENTION

The present invention is a method and apparatus wherein water and liquid waste can be freed of suspended solids by gravitational clarification-filtration operation which, using an uncomplicated mechanism in a single vessel, can bring waste water or other liquid waste to an extremely low solids content.

The apparatus includes a clarifier tank and one or more baffles mounted alongside the wall of the tank or otherwise positioned in the flow path of liquid passing through the tank. The baffles define a compartment which contains a bed of buoyant filter media through which flows clarified liquid from the tank. As liquid flows through the compartment fine solids are trapped in the bed.

Apparatuses are provided for periodically cleaning collected solids from the bed. In some instances, these apparatuses comprise means to agitate and/or expand the filter media which makes up the bed. Agitation or expansion of the bed causes trapped solids to separate whereafter they descend by gravity to the bottom of the clarifier tank where they combine with the sludge layer. Agitation and/or bed expansion can be accomplished by mechanical stirring or pumping of media, by gas injection or by liquid backwashing.

Because the trapped solids are processed with the clarifier sludge, no separate solids handling facilities are required for processing filter sludge. It is thus possible to efficiently modify an existing clarifier tank to a construction and for operation according to the present invention. And, new installations for producing high purity liquid would require a minimal capital investment.

The present invention is particularly beneficial in sewage treatment systems. The clarifier filtration apparatus of the present invention makes it possible to accomplish both secondary and tertiary sewage treatment stages in a single tank which eliminates the need to pump effluent liquid from a clarifier to a separate filter. Gravitational separation, possibly assisted by flocculants, occurs in the clarifier tank, followed by a high efficiency, low headloss filtration of clarified waste water. Sludge from both the secondary stages is processed together; and the flow of liquid through the clarifier tank does not need to be halted or diverted during filter bed cleaning.

It is an object of this invention to provide a compact apparatus for producing high purity liquid by the thorough separation of suspended solids from a stream of waste water or other liquid containing suspended solids.

A further object is to provide such an apparatus which is self-contained in a single unit.

An additional object is to provide means for converting existing clarifier tanks to perform a filtration of partially clarified liquids.

Another object is to provide a filter that includes a buoyant media so that the filter can be used in a clarifier tank without danger that filter media will somehow escape and combine with the sludge at the bottom of the tank.

Yet another object is to provide an automated and substantially maintenance-free apparatus for removing solids from a clarified liquid.

Also an object is to provide a clarifier tank with a filtration apparatus that can be cleaned without interrupting the flow of liquid through the tank.

Various other objects and advantages of this invention will become apparent upon reading the following specification.

BRIEF DESCRIPTION OF THE DRAWINGS

In the drawings:

FIG. 6 is a partial, sectional view showing a fourth alternate embodiment;

FIG. 7 is a partial, sectional view showing a fifth alternate embodiment;

FIG. 8 is a plan view of a circular clarifier and filtration apparatus including an annular filtration compartment divided by radially extending walls into a plurality of chambers;

FIG. 9 is a partial sectional view showing a sixth alternate embodiment;

FIG. 10 is a partial sectional view showing a seventh alternate embodiment;

FIG. 11 is a partial sectional view showing an eighth alternate embodiment; and

FIG. 12 is a vertical, schematic view of a test clarifier and filtration apparatus according to the present invention.

DESCRIPTION OF PREFERRED EMBODIMENTS

Figure 1:
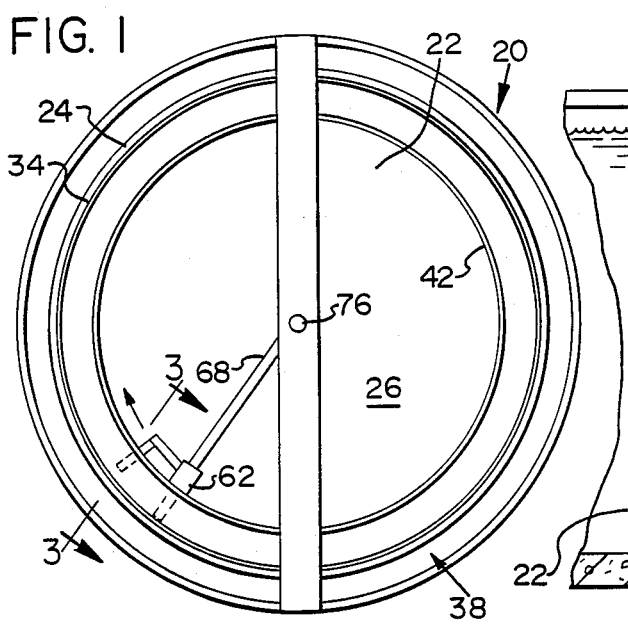
FIG. 1 is a plan view of a circular clarifier and filtration apparatus according to the present invention.

In most industrial and municipal waste processing and water purification installations, clarifier tanks are used for the gravitational separation of suspended solids from liquids. Such tanks are constructed in a variety of shapes and sizes, most being generally rectangular tanks with vertical walls or circular cylindrical tanks of the type shown in FIGS. 1, 2 and 12 of the drawings.

The various drawing figures show a typical clarifier tank 20 of the type used for secondary clarification of sewage. The illustrated tank 20 has a single, cylindrical sidewall 24 which defines a settling zone 22. A bottom 26 completes the enclosure. Rectangular tanks, having pairs of opposed side- and endwalls, and tanks in other shapes, can also be used for clarification.

The clarifier tank is provided with an inlet for waste water or other liquid waste and an outlet through which clarified liquid is discharged. In the illustrated embodiments, the outlet is an effluent weir 34. The liquid level in the tank 20 is maintained substantially at a constant height by the height of the weir.

The weir 34 extends along the top of the sidewall 24 along all or part of its length. The top of the weir 34 is horizontal along its entire length and is positioned to comprise the lowest portion of the tank boundary so that clarified liquid leaving the tank flows over the weir 34. V-notch weirs of standard construction are suitable for most applications.

For the purpose of this discussion, "clarified" or "partially clarified" liquid should be understood to mean any liquid which has passed through the settling zone 22 wherein some portion of any suspended solids is removed by gravitational separation.

A liquid collection trough or channel 38 is located outwardly of the weir to collect clarified liquid effluent. Typically, the channel 38 will extend the full length of the weir along the sidewall 24.

The effluent of a clarifier tank may sometimes be used directly for industrial or other purposes. But frequently, it is necessary to further treat the effluent liquid to remove fine particles which do not readily separate by gravity in the clarifier. For example, to effectively reduce the turbidity of clarified waste water, the clarifier effluent might be piped from the channel 38 to a filtration unit for the removal of suspended fine solids.

According to various embodiments of the present invention, filtration apparatus is located directly on or within a clarifier tank. Such filtration devices take advantage of their proximity to liquid in the clarifier tank by including one or more chambers which contain a buoyant filter media disposed at or near the surface of liquid in the tank.

Figure 2:
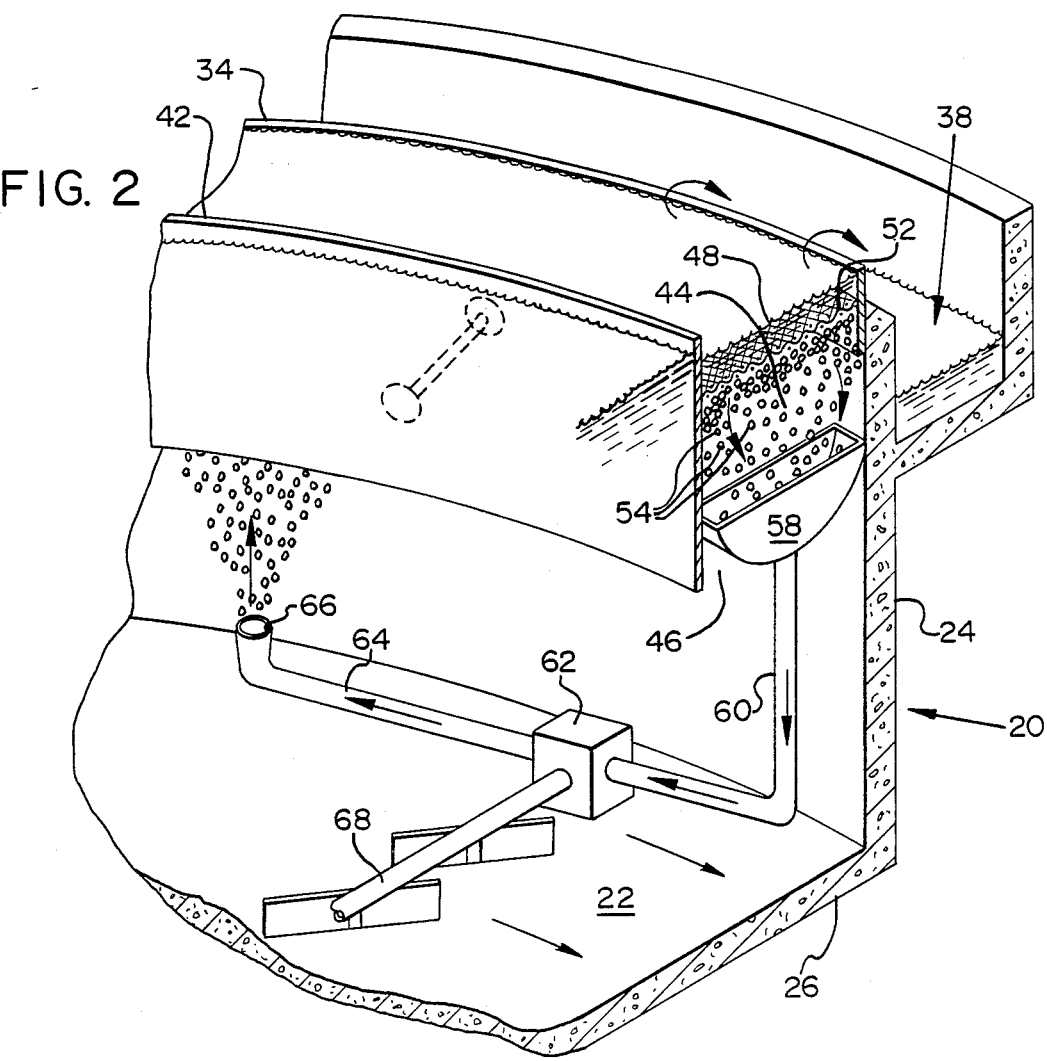
FIG. 2 is a partial, oblique, sectional view of the apparatus shown in FIG. 1.

According to a first embodiment of the present invention, shown in FIGS. 1 and 2, a high efficiency, low headloss filtration apparatus is formed inside the tank 20 by a vertical baffle 42 which is located inwardly of the weir 34 and which generally conforms to the shape of the weir. Specifically, the baffle 42 is a cylinder of smaller diameter than that of the concentrically cylindrical weir 34. The baffle extends to a greater height than the weir so that a compartment 44 is defined. The compartment is bounded on one side by the baffle 42 and on the other side by sidewall means including the weir 34 and sidewall 24.

Both the top and bottom of the compartment are open so that a downwardly facing annular inlet opening 46 connects the settling zone 22 with the compartment 44. The open top of the compartment is an annular compartment outlet opening 48 through which liquid flows to the weir.

A horizontal foraminous member such as a screen 52 extends between the baffle and sidewall means and is located in such a position to divide the compartment 44 into upper and lower regions. Positioned within the lower region of the compartment is a bed of particulate media 54 which has a density less than that of the liquid to be filtered. Because the bed of the media is trapped beneath the screen 52 and maintained against the bottom surface of the screen due to buoyancy of the media, all partially clarified liquid from the settling zone 22 flows upwardly through the bed enroute to the weir 34. As partially clarified liquid moves through the bed, solids are separated and collect in the bed.

After an extended period of operation, the bed of media 54 will become clogged with collected solids so that flow through the bed will be reduced. In an extreme circumstance, the bed might become so clogged that flow would cease entirely and liquid would break an unobstructed passageway through the media. It is therefore necessary to provide a means for periodically cleaning the filter media to maintain a good flow of liquid through the bed.

The most advantageous methods for cleaning the media employ an apparatus for agitating the media particles 54 so that collected solids are shaken loose and can descend by gravity to the bottom 26 of the tank 20. As illustrated in FIGS. 1 and 2, this apparatus may comprise means for mechanically circulating media particles 54 through a liquid to dislodge solids collected in the bed.

The illustrated cleaning apparatus includes a collector head 58 which connects to a conduit 60 extending to a pump 62. A discharge conduit 64 extends from the pump and terminates in outlet opening 66 which is located at a position below the inlet opening 46 of a compartment 44. This entire cleaning apparatus may be supported on a moveable scraper arm 68 which extends along the bottom 26 of the tank 20 and connects to a rotary shaft at the center of the tank.

As the scraper arm 68 travels along the bottom 26, it carries the collector head 58 through the compartment 44 along the length of the weir. As it moves along, the pump 62 pulls a stream of liquid and some media particles through the opening of the collector head 58; and subsequently releases the stream through the outlet opening 66. As the media particles pass through the conduits and the pump, trapped solids are dislodged. Thus, when the stream is released at the outlet 66, the dislodged solids flocculate and settle to the bottom 22 of the tank. The buoyant media particles move upwardly and back into the compartment 44.

As the media particles travel upwardly through the liquid located beneath the compartment 44, they are washed by the passing liquid so that additional collected solids are shed from the media particles and fall to the floor 22 of the tank.

Figure 3:
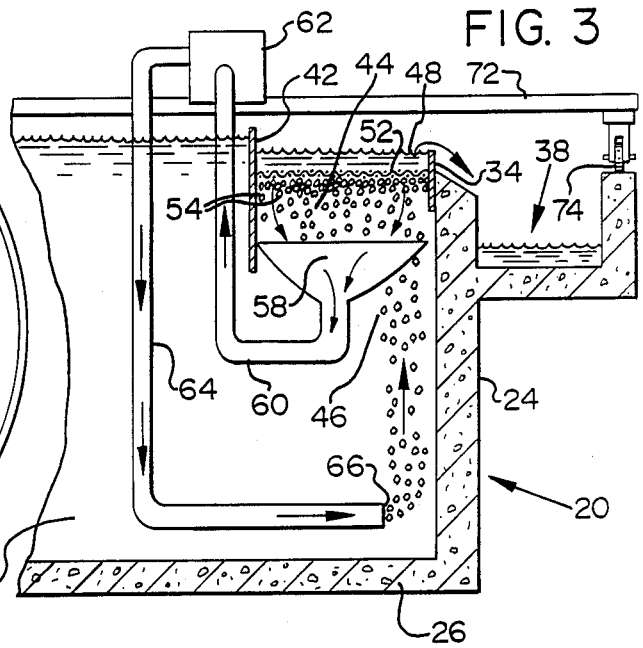
FIG. 3 is a partial, sectional view of a first alternate embodiment of the invention as it would appear if taken along line 3—3 of FIG. 1.

FIG. 3 shows another filter embodiment using a circulation mechanism for cleaning buoyant media.

The apparatus of FIG. 3 is related to the apparatus shown in FIGS. 1 and 2. Accordingly, some components shown in FIG. 3 are identified by reference numbers used to identify analogous components shown in FIGS. 1 and 2. In FIG. 3, the cleaning means are supported on a carriage 72 which extends above the clarifier tank 20. When used with a circular tank of the type illustrated, the carriage 72 is supported on the outer wall of the trough 38 by casters 74. The inner end of the carriage is supported by a rotating central shaft 76. The carriage 72 rotates as the shaft 76 turns so the collector head 58 is carried through the compartment 44.

The outlet opening 66 is located at a distance behind the advancing collector head 58 so that there is no interference between particles returning to the bed and those being collected in the collector head 58. This spaced relationship of the collector head to outlet opening 66 works well in a circular tank since the cleaning mechanism always revolves in a given direction and never approaches an endwall which would limit its travel.

In a rectangular tank, a carriage preferably would be supported at each end by casters riding on two opposite tank sidewalls and the carriage would move back and forth across the surface of the tank. With such an arrangement, it would be advantageous to have the collector head 58, outlet opening 66 and other components of the cleaning mechanism substantially aligned in a vertical plane. A cleaning mechanism so arranged could most closely approach the endwalls of the rectangular tank.

Figure 4:
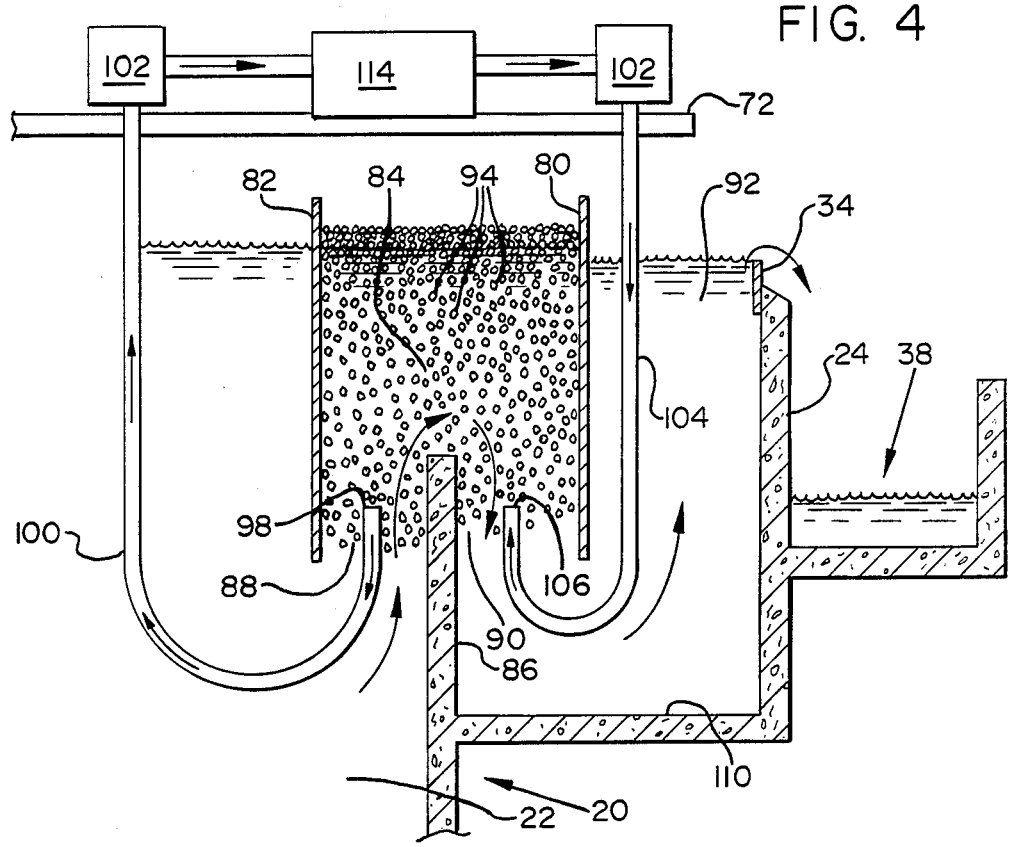
FIG. 4 is a partial, sectional view showing a second alternate embodiment.
Figure 5:
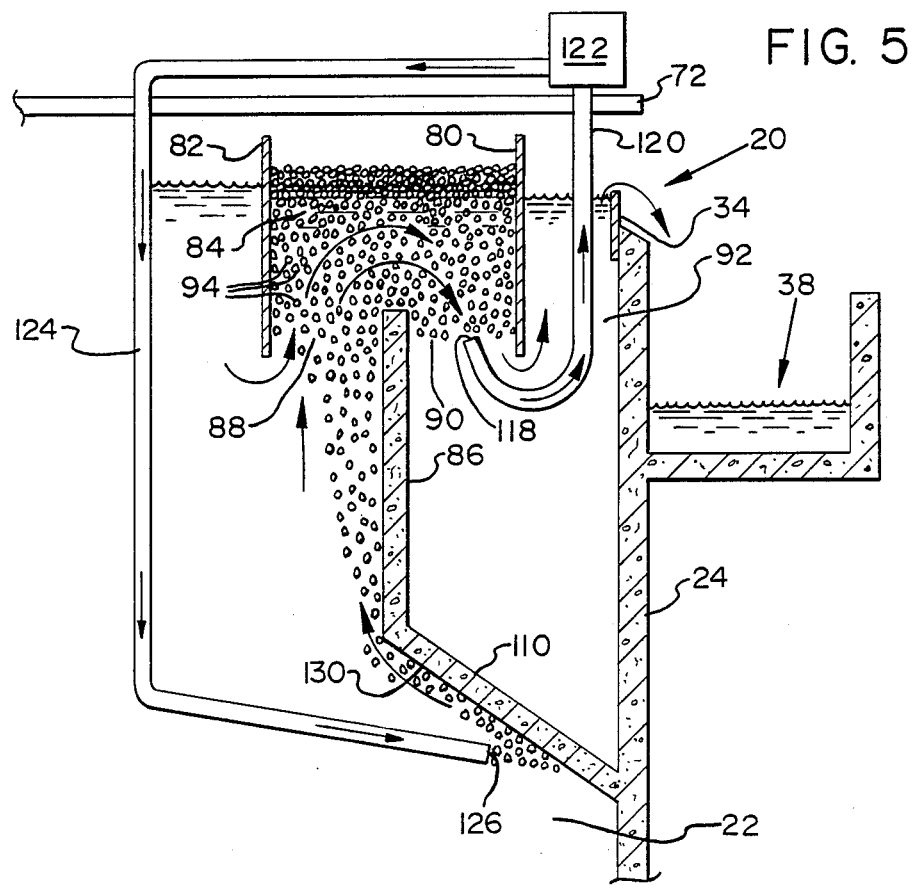
FIG. 5 is a partial, sectional view showing a third alternate embodiment.

Other embodiments of the invention are illustrated in FIGS. 4 and 5. In both these embodiments, the baffle means comprises two separate baffles 80, 82 spaced apart from one another. Both of the baffles 80, 82 extend to a greater height than the weir 34 and are located inwardly from the weir so that a filter compartment 84 is defined between the baffles at a location inwardly of the weir. Preferably, the baffles 80, 82 will conform to the weir so that in a circular tank, the weir 34 and baffles 80, 82 will comprise three concentric cylindrical walls.

A submerged divider 86 extends inwardly from the sidewall 24, below the baffle 80 and upwardly into the compartment 84 so that the top of the divider 86 is located at a level below the top of the weir 34. The compartment thus has a downwardly facing inlet opening 88 which is defined between the divider 86 and the baffle 82 which is furthest from the sidewall. The inlet opening 88 connects the settling zone 22 with the compartment 84.

A downwardly facing outlet opening 90 is defined between the divider 86 and the baffle 80 which is nearest the sidewall 24. This outlet opening 90 connects the compartment 84 with a region 92 which exists between the baffle 80 on one side and the sidewall 24 and weir 34 on the other side.

In the embodiments of FIGS. 4 and 5, buoyant filtration media 94 is contained between the baffles 80, 82. Because the media is less dense than liquid which flows through the bed to the weir 34, it is retained between the baffles 80, 82 so long as liquid in the tank 20 is maintained at a predetermined minimum level. Because the baffles 80, 82 are higher than the weir 34, neither liquid nor media can be carried over the baffles into the region 92. En route to the weir 34, liquid flows through the inlet opening 88 over the divider 86, passing through the bed of media 94, then through the outlet opening 90 and into the region 92 before discharge over the weir 34.

In both the embodiments of FIGS. 4 and 5, one or more pumps are provided for periodically removing a portion of the media 94 from the compartment 84 and for releasing the removed portion of media at a position below the compartment so that the removed portion rises through liquid located beneath the bed. In both the illustrated embodiments, these pump mechanisms are mounted on an overhead carriage 72.

The particular embodiment of FIG. 4 shows a cleaning apparatus having collector 98 which extends into the inlet opening 88. The collector 98 comprises the open end of a conduit 100 which connects to the first of two pumps 102. A conduit 104 extends from the second of the pumps 102 and terminates in an outlet opening 106 which is located beneath the compartment 84 in such a position that material discharged from the outlet opening 106 enters the compartment 84 through the outlet opening 90.

The apparatus of FIG. 4 is thus constructed to remove media through the inlet opening 86, and replace the media through the outlet opening 90 so that the media travels through the compartment 84 countercurrently to liquid moving through the compartment from the inlet opening 88 to the outlet opening 90. Thus, the fraction of media which contains the greatest amount of trapped solids is removed while the cleaned media is replaced at the downstream end of liquid flow through the compartment 84.

As previously described, suspended solid material collected in the media is dislodged as the media travels through the circulation system including the conduits 100, 104 and pumps 102. Liquid discharged through the outlet opening 106 thus includes media which is substantially clean and solid particulate material which was separated from the media. The solid waste material, which was increased in particle size due to collection in the media, descends by gravity to a floor portion 110 of the divider 86. The solid waste material may be collected from the floor 110 by any of the methods commonly used to collect sludge from the bottom of a clarifier tank. Scrapers, drain outlets, or siphon mechanisms can be employed.

To provide added agitation for cleaning the particulate media 94, a washer apparatus 114 can be included between the pumps 102. Such a washer apparatus could include a blender or agitator to more thoroughly agitate the particles and thereby separate absorbed solids. Also, the washer 114 could include apparatus for washing the media with a stream of liquid in such a manner that solids separated from the media are carried off with a flow of effluent washing liquid. If such a washer is used, there is no way for solids to reenter the clarifier tank through the outlet opening 106 so that no substantial collection apparatus would be required to clear solids from the floor portion 110.

The embodiment of FIG. 5 completely avoids the problem of solids settling on the floor portion 110. In this embodiment, particles of media and liquid are removed from the compartment 84 through a collector 118 which is the open end of a conduit 120 that extends into the outlet opening 90. Media and liquid are pumped through the conduit 120 by means of a pump 122. The mixture of media and liquid is returned to the settling zone 22 through a conduit 124 which terminates with an outlet opening 126.

The media and liquid traveling through the compartment 84 move concurrently so that liquid entering the compartment 84 first contacts the cleanest media. Media containing the greatest amount of trapped solids is removed by the cleaning apparatus through the outlet opening 90.

A particularly advantageous feature of the embodiment shown in FIG. 5 is that the divider 86 includes a downwardly facing ramp surface 130 which extends generally upwardly and away from the sidewall 24. The media circulation mechanism is constructed with its outlet opening 126 located below this ramp surface 130 so that media particles discharged from the outlet opening 126 rise until they contact the ramp surface 130. Thereafter, the particles move along the ramp surface and eventually back into the compartment 84 through the inlet opening 88. The divider 86 can be hinged to the sidewall 24 so that the tilt of the ramp surface is adjustable.

As mentioned above, the arrangement of FIG. 5 substantially eliminates any need for collecting solids on the floor portion 110 of the divider 86. It is a further advantage that contact between particles of media 94 and the ramp surface 130 enhances the separation of solids from particles of media 94 due to frictional contact between the ramp surface 130 and the particles. Because the ramp surface 130 extends over the settling zone 22, solids separated from the media particles fall to the bottom of the separating zone 22 by gravity and are collected with sludge which accumulates at the bottom of that zone.

FIGS. 6 and 7 show still other embodiments of the present invention. In many respects, the embodiments of FIGS. 6 and 7 are similar to those shown in FIGS. 2 and 3. Accordingly, analogous features are similarly numbered.

The embodiment shown in FIG. 6 incorporates a gas injection means for cleaning particles of media 54 by introducing a stream of gas bubbles into the filter bed. This is accomplished by providing a distribution conduit 134 which is connected to a source of pressurized gas, such as air. Feeder lines 136 extend from the conduit 134. Each of the lines 136 terminates with a gas injection orifice 138 which is located at a position below the bed of media 54. As illustrated in FIG. 6, the orifices 138 are positioned between the sidewall 24 and the baffle 42 so that all gas will pass upwardly through the bed.

Bursts of air are periodically injected through the orifices 138 to agitate media 54 which forms the bed. This agitation causes the separation of solids trapped in the bed. After separation, solids fall to the bottom 26 of the clarifier tank where they combine with sludge at the bottom of the tank and are collected by ordinary means.

FIG. 6 further illustrates the use of means to prevent media 54 from being carried into the settling zone 22 should there be a reduction in the level of liquid in the compartment 44. This media retention means comprises a second foraminous panel such as a screen 142 which extends between the sidewall 24 and the baffle 42. Should the level of liquid in the settling zone 22 drop below the bottom of the baffle 42, none of the particulate material will escape into the settling zone, but will be retained above the screen 142.

FIG. 7 illustrates another arrangement for preserving media inside the compartment 44. This embodiment comprises a normally submerged trough defined by a wall 148. The outermost end 150 of the wall 148 is located above the bottom of the baffle 42 so that liquid will be maintained in the trough at the level of the end 150 even if the settling zone 22 is drained of liquid. Thus, particles of particulate media 54 can not descend below the level of the baffle 42, because the trough always remains filled with liquid.

Solids separated from the bed in media 54 will collect in the trough of FIG. 7 when the bed of media is agitated, so means must be provided for removing separated solids from the floor of the trough. The illustrated suction collector 152 and pumps 154 can be used for that purpose. Other devices, such as drain outlets or siphon collectors, could also be used. The solids collection mechanism, including pump 154, is suspended from an overhead carriage (not shown). Means for agitating particulate media 54 could be of the type shown in FIGS. 3 or 6 or some similar device.

FIG. 8, which is a plan view of the apparatus shown in FIG. 6, illustrates a filtration compartment divided into a plurality of small chambers. In this particular embodiment, the sidewall 24 and weir 34 form a cylinder concentric with the baffle 42. A plurality of substantially vertical divider walls 158 extend radially through the compartment 44 to divide the compartment into a plurality of chambers. By dividing the compartment of this manner, it is possible to assure that the distribution of media is substantially uniform throughout the entire compartment. Periodic cleaning can be accomplished by operating a cleaning apparatus in one chamber at a time while uninterrupted filtration proceeds in other chambers.

A separate, vertically moveable weir segment can be provided for each chamber. The weir segment of any given chamber could be raised to stop the flow of liquid from that chamber into the trough 38 during cleaning of that chamber. This would eliminate any possibility of an inadvertent discharging of separated solids into the trough 38 during cleaning of the chamber.

Still other means for agitating the media particles are shown in FIGS. 9–11. In FIG. 9, particles of media 54 are retained beneath the screen 52. For cleaning, the particles are agitated by a mechanical agitator rake apparatus 170 which is mounted to an overhead carriage. As the carriage moves along sidewall 24, the agitator rake 170 is drawn through the bed of media 54 thereby agitating the media particles and dislodging collected solids. The fingers of the rake may be fixed or may be rotatably mounted. If rotatable, the fingers can include directionally oriented veins which facilitate rotation and thereby multiply the agitation which results as the rake 170 is drawn through the bed. Also, a stream of air may be delivered to the rake 170 and injected into the bed from outlets on the rake to further agitate the media.

FIG. 10 shows a very simple apparatus which is especially well suited for use in rectangular settling tanks. In this embodiment, the baffle 42 is mounted to the sidewall 24 by means of an expansible device such as a telescoping shaft 174. No screen extends between the sidewall 24 and baffle 42, but a vertical screen 176 extends upwardly from the weir 34.

To agitate particles using the apparatus of FIG. 10, the baffle 42 is moved away from the sidewall 24 by extending the telescoping shaft 174 so that the bed widens and becomes more shallow. During lateral expansion of the bed, particulate madia is less closely packed than when the bed is at rest. Due to the dispersion and movement of media particles through liquid in the compartment 44, collected solids are separated and fall to the floor of the settling zone.

Like the embodiment of FIG. 10, the apparatus of FIG. 11 includes a vertical screen 176 which extends upwardly from the weir 34. In this embodiment the baffle 42 is mounted in a fixed position, and a skimmer mechanism 180 is included to move across the surface of the bed and thereby agitate the media.

The illustrated skimmer 180 is suspended from an overhead carriage and includes a collector head 182 with a downwardly opening orifice connected by a conduit 184 to a pump 186. The pump pulls a stream of clarified liquid and particles of media 54 from the top of the bed. The stream moves through the conduit 184 into the conduit 188 and is discharged through an outlet opening 190. The outlet opening 190 is located beneath the bed of media 54 so the discharged media rises to the bottom of the bed and solids separated from that media, due to agitation while being pumped through the conduits 184, 188, fall downwardly to the bottom of the settling zone.

OPERATION

All the illustrated embodiments of the invention operate in a similar manner. The basic method of operation is best understood with reference to FIG. 12 which schematically illustrates a test clarifier of the type specifically shown in FIG. 6.

A stream of liquid water or liquid waste containing suspended solids is carried into a clarifier tank 20 via an inlet line 202. The line 202 opens into the tank's center well which is defined by a cylindrical wall 204. Because the wall 204 is higher than the weir 34, liquid deposited in the well via the inlet pipe 202 flows from the well through the settling zone 22 en route to the weir 34 which is the outlet over which liquid escapes from the tank 20.

The rate at which liquid is introduced through the line 202 and the size of the settling zone 22 are selected so that the liquid is retained in the settling zone for a period of time sufficient that suspended solids in the liquid are gravitationally separated and descent to the bottom 26 of the tank 20. Solids on the tank floor are moved to the center of the tank by the scraper arm 68 to be removed through the drain line 206. Liquid, partially clarified in the settling zone 22, leaves the tank 20 by passing over the weir 34. On its way to the weir 34 a stream of the partially clarified liquid passes through the bed of particulate filtration media 54. As the liquid passes through the bed, solids remaining in the partially clarified liquid are collected so that the effluent liquid is substantially free of solids.

In the particular embodiment illustrated in FIG. 12, cleaning of the media 54 is accomplished by periodically injecting air through the orifices 138. The media 54 is agitated to such an extent that solids collected in the bed are separated from the media and descend by gravity through the inlet opening 46 to the tank bottom 26.

A number of tests have been conducted to determine the suitability of the present invention for the purification of a partially clarified liquid. These are discussed in the following examples.

EXAMPLE 1

A five foot plexiglass cylinder, having a 5⅜ inch inside diameter, was supported vertically. The top and bottom ends of the cylinder were closed except that a 5/16 inch tube extended through the top closure to carry effluent liquid out of the cylinder and a similar tube was provided through the bottom closure to supply influent liquid.

A circular wire screen was positioned six inches below the top of the cylinder to limit the upward movement of buoyant media inside the cylinder. A sufficient amount of media, polyethelene beads of 3 mm. diameter, was introduced so that a 12 inch layer of media formed beneath the screen when the cylinder was filled with liquid. A variable speed pump was used to maintain a flow of influent liquid into the cylinder via the tube extending through the bottom closure.

To test the suitability of this filtration apparatus, water from the effluent channel of the Albany, Oreg. sewage treatment plant was pumped through the influent tubing into the base of the plexiglass cylinder. The liquid flowed upwardly through the cylinder, the bed of filter media beads and the screen. It then left the cylinder through the tube which extended through the top closure.

Flow rate was established at four hundred mililiters per minute to simulate a typical overflow rate for the final clarifier at the Albany sewage treatment plant. Four hundred milileters per minute was selected as a conservative figure to account for the increased flow rate which would result during a period of heavy rain fall.

After operating for eight hours, influent and effluent samples were obtained. The pump was then disconnected and the top closure removed from the cylinder. The beads were agitated with a rod so that the solids lodged in the filter media would be released. After obtaining a complete mixture by agitation and stirring, a sample of the mixture was collected. Analysis of the samples showed that up to 10.0 mg. of suspended solids were removed from each liter of water passing through the apparatus.

During operation of the apparatus, it was noticed that turbulence from the inflowing liquid would stir the bottom inch of the beads in the bed but that the top eleven inches remained stationary. After three hours of operation, a visible amount of suspended solids had been trapped in the lower inch of stationary beads. There was also a noticable color difference between the influence liquid below the beads and the six inches of effluent above the screen.

After eight hours, trapped particles were visible in the lower four inches of the stationary beads. When the flow was stopped and a valve was opened briefly to create backflow, the resulting turbulence caused the beads to release trapped solids which immediately began to settle to the bottom of the cylinder.

EXAMPLE 2

The test of Example 1 was repeated at a higher liquid flow rate of two liters per minute. This was done to approximate the conditions which would result if a band of filter media were located at the outer edge of a clarifier to form a filter of the type shown in the drawings.

An analysis of samples obtained during this test showed the removal of up to 6.6 mg. of suspended solids per liter of water.

EXAMPLE 3

A second series of test runs were conducted using a box-like test filter of 16 inches by 16 inches in cross section. The filter contained a twenty-four inch bed of polyethelene beads approximately three milimeters in diameter and 0.952 in specific gravity. The beads were retained in position by a screen covering the top of the filter. A bottom screen was installed about thirty inches below the top screen to provide sufficient room for bed expansion during cleaning.

The test apparatus was operated as an upflow filter. The first four of six runs were conducted using secondary clarifier effluent from the package activated sludge sewage treatment plant of the city of Philomath, Oreg. as influent for the filter.

The influents used in runs 5 and 6 were formulated by adding a small amount of mixed liquor to the secondary clarifier effluent. The result was a composite fluid which contained a somewhat higher solids concentration than the secondary clarifier effluent. The results of these tests are summarized in Table I:

cleaning system could thus be constructed by arranging a fixed nozzle array of twelve ⅛ inch nozzles per square foot of media bed to accomplish cleaning in about 15 seconds. Alternatively, a single jet could be used to sweep across the media bed.

Air scouring was performed by supplying air beneath the bottom screen of the test apparatus through a diffuser. The air orifices were 1/16 inch in diameter and were spaced at intervals of three inches. About four orifices were required per square foot of media. The amount of air required for effective cleaning varied with the depth of the media. To effectively clean a bed of media two feet deep, about three cubic feet per minute per square foot of media bed surface was necessary for a filter operating at an upflow rate of six gallons per minute per square foot. The amount of air required for effective cleaning increased as the depth of the media bed or the filter upflow rate was increased.

During either water jetting or air scouring cleaning, most of the solids detached from the media would settle to the tank bottom. But, a small fraction of separated solids would be carried over to the effluent side if liquid continued to flow upwardly through the disturbed bed. It appeared that ten to twelve percent of the collected solids would escape with the filter effluent, if liquid flow through the filter was maintained during a cleaning operation.

Thus, if high filter effluent quality is critical, flow of liquid through the filter should be stopped during the cleaning cycle. For a filter contained within a clarifier tank as illustrated in the drawings, the flow of clarifier influent could be halted during filter cleaning But, such a flow stoppage would, however, be disruptive to plant operation. Continuous operation could be maintained by using a filter compartment divided into multiple chambers. A single chamber could be isolated and cleaned while flow continues through all other chambers. This procedure avoids the necessity of periodically stopping the entire flow of clarifier influent and effluent.

EXAMPLE 4

Tests were conducted in a nine foot circular clarifier with a ten foot sidewall diameter, using apparatus substantially as diagrammed in FIG. 12. The filtration compartment 44 extended around the perimeter of the clari-

TABLE I

| Run No. | Source of Influent | Run Length (hrs.) | Filter Rate (gpm/ft.$^2$) | Filter Infl. Solids (mg./l.) | Filter Effl. Solids (mg./l.)* | Solids Capture (lb./ft.$^2$/in.) | Removal % | Initial Headloss (in.) | Final Headloss (in.) |
|---|---|---|---|---|---|---|---|---|---|
| 1 | Secondary Effluent | 6.0 | 3.00 | 12.38 | 5.7 | 0.30 | 57 | 0.8 | 1.0 |
| 2 | Secondary Effluent | 6.0 | 3.00 | 20.00 | 9.3 | 0.32 | 54 | 0.8 | 1.1 |
| 3 | Secondary Effluent | 1.25 | 3.00 | 60.00 | 13.5 | 0.10 | 78 | 0.9 | 1.8 |
| 4 | Secondary Effluent | 5.0 | 3.00 | 34.00 | 7.3 | 0.14 | 79 | 0.7 | 2.1 |
| 5 | Mixture of Secondary Effluent and Mixed Liquor | 3.0 | 3.00 | 180.00 | 17.0 | 0.17 | 91 | 1.0 | 5.25 |
| 6 | Mixture of Secondary Effluent and Mixed Liquor | 1.0 | 3.00 | 199.00 | 69.0 | 0.05 | 65 | 1.25 | 5.56 |

*Filter effluent concentrations are averages during the run, and do not include solids washout.

Several methods were used to clean filters during the test runs. Both downward water jetting and air scouring were found to be effective.

Water jetting was accomplished using a jet of water issued from a ⅛ inch tube at a pressure from 20 to 55 pounds per square inch. A single jet would agitate an area of media about four inches in diameter. A suitable fier and was divided into two chambers by vertical divider walls. The chambers each enclosed a total horizontal area of 3.2 square feet.

A first of the chambers contained a two foot bed of polyethylene beads which were about three milimeters in diameter. The beads were contained between the two horizontal screens 52, 142 made of No. 10 screening. The top screen was about 12 inches below the top of the effluent weir 34 and the bottom screen 142 was located three feet below the top screen 52. A steel baffle 42 was positioned concentric to the exisiting clarifier weir.

The second chamber was not filled with filter media. Rather, its portion of the weir was blocked off; and regulated flow from the second chamber was obtained using a siphon. The flow rate through the siphon was matched to flow rate through the filter media in the first chamber to substantially equalize the clarifier hydraulics.

In this series of tests, eight runs conducted using influent liquids obtained from the Philomath, Oreg. sewage treatment plant. The first six runs were made using mixed-liquor having a suspended solids content which ranged from 1280 to 2140 mg. per liter and averaged about 1710 mg. per liter. The average sludge volume index of the mixed-liquor supplied to the test clarifier was 411 and fell within a range of 182 to 608. Runs seven and eight were conducted using an influent of clarifier effluent from the Philomath sewage treatment plant. The results of these test runs appear in Table II:

TABLE II

| Run No. | Source of Influent | Run Length (hrs.) | Filter Rate (gpm/ft.$^2$) | Filter Infl. Solids (mg./l.) | Filter Effl. Solids (mg./l.)* | Solids Capture (lb./ft.$^2$/in.) | Removal % | Initial Headloss (in.) | Final Headloss (in.) |
|---|---|---|---|---|---|---|---|---|---|
| 1 | Mixed Liquor | 3.3 | 2.10 | 134 | 20 | 0.39 | 85 | 0.4 | 2.8 |
| 2 | Mixed Liquor | 4.0 | 1.80 | 153 | 12 | 0.76 | 92 | 0.6 | 3.5 |
| 3 | Mixed Liquor | 1.5 | 2.40 | — | — | — | — | 1.0 | 3.4 |
| 4 | Mixed Liquor | 1.5 | 1.67 | 477 | 76 | 0.50 | 84 | 1.0 | 3.3 |
| 5 | Mixed Liquor | 1.2 | 1.90 | 630 | 112 | 0.58 | 82 | 2.0 | 3.3 |
| 6 | Mixed Liquor | 2.0 | 1.76 | 430 | 85 | 0.61 | 80 | 1.5 | 3.4 |
| 7 | Secondary Effluent | 6.0 | 5.20 | 9.3 | 5.7 | 0.14 | 39 | 1.0 | 1.4 |
| 8 | Secondary Effluent | 4.0 | 5.20 | 10.6 | 9.4 | 0.11 | 11 | 1.75 | 2.0 |

*Filter effluent concentrations are averages during the run, and do not include solids washout.

During the first six runs, mixed-liquor was fed to the center well of the clarifier at a rate of about twenty-one gallons per minute. The rate of sludge withdrawal through the drain line 206 was about thirteen gallons per minute. Because of poor settability of the mixed-liquor used during the test, no clear sludge interface could be located. Samples used to determine the filter influent solids content were taken at a level just below the bottom screen 142.

After each run, the filter was cleaned by air scouring, using air injected through the orifices 138. Although most of the separated solids descended to the bottom of the tank 20, some wash out solids stayed in suspension on top of the media and then were carried over the weir 34 when filtration was resumed. Some mud balls were formed in the compartment 44 during the test. Some of these were larger than the screen openings and thus could not descend to the floor of the tank 20 during cleaning. By adopting an apparatus that omits the bottom screen 142, any difficulty resulting from mud ball formation is eliminated.

While we have shown and described the preferred embodiments of our invention, it will be apparent to those skilled in the art that changes and modifications may be made without departing from our invention in its broader aspects. We therefore intend the appended claims to cover all such changes and modifications as follow in the true spirit and scope of our invention.

We claim:

1. A filtration apparatus comprising:
   a compartment having an inlet and an outlet arranged so that liquid flows upwardly through the compartment;
   a bed of cleanable particulate media that is buoyant in the flowing liquid from which solids are to be filtered, the bed being contained in the compartment in such a manner that liquid flows upwardly through the bed so that solids suspended in the liquid are collected in pores of the bed; and
   cleaning means for periodically increasing the volume of the bed, without removing any media from the compartment or creating a countercurrent flow of fluid through the bed, the cleaning means being constructed to expand the bed downwardly, away from the outlet, to such an extent that solids collected in the bed are released from the pores and separated from the media.

2. An apparatus according to claim 1 wherein the cleaning means comprises means for periodically injecting gas into the bed without creating a countercurrent flow of liquid through the bed.

3. A method for removing suspended solids from a stream of liquid comprising:
   channeling a stream of liquid containing suspended solids so that the stream flows upwardly through a bed of cleanable particulate filtration media that is buoyant in the flowing liquid so that suspended solids are collected in the pores of the bed; and
   periodically injecting gas into the media, without creating a countercurrent flow of fluid through the bed, so that the volume of the bed is increased and solids collected in the bed are released from the pores and separated from the media.

4. The method of claim 3 further comprising stopping the upward flow of the stream during the injecting.

5. An apparatus for removing solids from liquid water or liquid waste comprising:
   a clarifier tank including a bottom and sidewall means which define a settling zone wherein liquid is partially clarified by gravitational separation of suspended solids from the liquid;
   inlet means for delivering a stream of liquid with suspended solids into the settling zone;
   outlet means comprising a horizontal weir which extends along the top of at least a portion of the sidewall means and which is the uppermost extension of that portion of the sidewall means;
   a generally vertical baffle means extending along and spaced from the weir to define a compartment with an inlet and an outlet located so that liquid partially clarified in the settling zone flows through the compartment;

located within the compartment, a bed of cleanable particulate media of less density than the liquid, the bed being positioned in such a manner that the partially clarified liquid flows through the bed, so that solids in the partially clarified liquid collect in pores of the bed and are separated from the liquid;

means for retaining the media within the compartment; and cleaning means for mechanically removing a portion of the particulate media from the bottom of the bed and circulating the removed media through a volume of liquid in the clarifier tank, upstream of the bed, to dislodge the collected solids and for redepositing the removed media on the bottom of the bed after the solids are dislodged.

6. An apparatus according to claim 5:

constructed to contain a volume of partially clarified liquid beneath the bed; and wherein the cleaning means comprises a pump for periodically removing a portion of the media from the bed and for releasing the removed portion at a position beneath the bed so that the removed portion rises through the partially clarified liquid located beneath the bed.

7. An apparatus according to claim 5 further comprising media retention means to prevent the media from being carried into the settling zone when there is a reduction in the level of liquid in the compartment.

8. A filtration apparatus comprising:

a compartment having an inlet and an outlet arranged so that liquid flows upwardly through the compartment;

a bed of cleanable particulate media of less density than the liquid from which solids are to be filtered, the bed being contained in the compartment in such a manner that liquid flows upwardly through the bed so that solids suspended in the liquid are collected in pores of the bed; and cleaning means for periodically increasing the volume of the bed, without removing any media from the compartment or creating a countercurrent flow of fluid through the bed, the cleaning means including apparatus for rapidly expanding a horizontal dimension of the compartment so that, upon expansion of the dimension, the media spreads to fill the larger area and, during spreading, occupies a greater volume than when at rest, the apparatus being constructed to expand the dimension to such an extent that solids collected in the bed are released from the pores and separated from the media.

* * * * *